(12) United States Patent
Dhanjani

(10) Patent No.: US 11,521,187 B2
(45) Date of Patent: Dec. 6, 2022

(54) WIRELESS DEVICE FOR RETROFITTING ATMS

(71) Applicant: NCR Corporation, Atlanta, GA (US)

(72) Inventor: Kashish Raaj Dhanjani, Mumbai (IN)

(73) Assignee: NCR Corporation, Atlanta, GA (US)

( * ) Notice: Subject to any disclaimer, the term of this patent is extended or adjusted under 35 U.S.C. 154(b) by 321 days.

(21) Appl. No.: 16/845,819

(22) Filed: Apr. 10, 2020

(65) Prior Publication Data

US 2021/0319416 A1   Oct. 14, 2021

(51) Int. Cl.
*G06Q 20/00* (2012.01)
*G06Q 20/10* (2012.01)
*G07F 19/00* (2006.01)

(52) U.S. Cl.
CPC ....... *G06Q 20/1085* (2013.01); *G07F 19/211* (2013.01)

(58) Field of Classification Search
USPC ........... 705/43, 39, 37, 26, 38; 235/380, 370
See application file for complete search history.

(56) References Cited

U.S. PATENT DOCUMENTS

| | | | | | |
|---|---|---|---|---|---|
| 8,070,055 | B2 * | 12/2011 | Block | ................. | G06Q 20/325 235/472.01 |
| 10,762,505 | B1 * | 9/2020 | Morris | ................... | G06Q 20/36 |
| 10,769,896 | B1 * | 9/2020 | Farivar | ................... | G08B 5/36 |
| 2002/0032656 | A1 * | 3/2002 | Chen | ..................... | G07F 19/211 705/43 |
| 2002/0099658 | A1 * | 7/2002 | Nielsen | ............. | G06Q 20/1085 705/43 |
| 2002/0152165 | A1 * | 10/2002 | Dutta | ..................... | G06Q 20/04 705/41 |
| 2003/0074328 | A1 * | 4/2003 | Schiff | ..................... | G07F 19/20 705/75 |
| 2013/0124410 | A1 * | 5/2013 | Kay | ....................... | G07F 19/211 705/43 |
| 2015/0294296 | A1 * | 10/2015 | Koeppel | ............... | G06Q 40/02 705/35 |

(Continued)

OTHER PUBLICATIONS

Fingershield ATM—ATM Security System using Fingerprint Authentication; 2018 International Symposium on Electronics and Smart Devices (ISESD) (pp. 1-6); Christiawan Bayu, Aji Sahar, Azel Fayyad Rahardian, Elvayandri Muchtar; Oct. 23, 2018. (Year: 2018).*

(Continued)

*Primary Examiner* — Tien C Nguyen
(74) *Attorney, Agent, or Firm* — Schwegman, Lundberg & Woessner

(57) ABSTRACT

A wireless device is provided for retrofitting ATMs. The wireless device including a memory; at least one hardware processor coupled to the memory; a hardware interface coupled to the least one hardware processor; and, at least one antenna coupled to the at least one hardware processor, where the at least one hardware processor is configured to: (i) receive over the at least one antenna an instruction to retrieve state data; (ii) receive the state data over the hardware interface from an ATM; and, (iii) transmit over a virtual private network (VPN) using the at least one antenna the state data, where the VPN is separate from a financial institution network the ATM communicates with to perform transactions.

17 Claims, 10 Drawing Sheets

(56) References Cited

U.S. PATENT DOCUMENTS

2016/0180307 A1* 6/2016 Laracey ............... H04L 63/18
705/43

OTHER PUBLICATIONS

Modeling UI agents for public environments to enhance the V2oIP embedded ATM access point services; The 7th International Conference on Advanced Communication Technology, 2005, ICACT 2005. (vol. 1, pp. 670-675); V.C. Joseph, Dong-Myoung Seol, Eun-Ryoung Lee, Jiyoung Kwak, Jang-Hee Yu,Feb. 2005. (Year: 2005).*

* cited by examiner

| | | | SUPPORT SCREEN 800 | | |
|---|---|---|---|---|---|
| 802 ATM ID | 804 OPERATIONAL | 806 OS | 808 LAST SERVICE | 810 NEXT SERVICE | 812 EJ/ IMAGES |
| D18... | Y | Windows 10 | 10-10-2019 | 02-12-2020 | 2-14-2020 |

WIRELESS DEVICE FOR RETROFITTING ATMS

BACKGROUND

Automatic teller machines (ATMs) are installed throughout the world. Regulators or banks often require that electronic journals (EJ) of the transactions of the ATM and images from a camera of the ATM be retrieved from the ATM and securely stored outside the ATM. Additionally, ATMs communicate with a bank network for transactional information, but due to regulatory or security concerns the owners of the bank networks often do not permit the operators or maintainers of the ATMs to communicate with ATM using the bank network.

Moreover, it may be expensive to repair or service ATMs as often a repairperson is sent to repair the ATM with enough equipment to make any repairs that necessary. Additionally, a maintainer of ATMs may have difficulty maintaining and servicing many thousands of ATMs spread across a wide geographic area due to the difficult of getting and maintaining state data about the ATMs. Moreover, the installed ATMs tend to be aging and banks are reluctant to replace the ATMs with newer versions due to the continued growth of the use of mobile devices for banking services provided by the ATMs.

SUMMARY

In various embodiments, methods and wireless devices for retrofitting ATMs are presented.

According to an embodiment, a wireless device is provided for retrofitting ATMs. The wireless device including a memory; at least one hardware processor coupled to the memory; a hardware interface coupled to the least one hardware processor; and, at least one antenna coupled to the at least one hardware processor, where the at least one hardware processor is configured to: (i) optionally receive over the at least one antenna an instruction to retrieve state data; (ii) receive the state data over the hardware interface from an ATM; and, (iii) transmit over a virtual private network (VPN) using the at least one antenna the state data, wherein the VPN is separate from a financial institution network the ATM communicates with to perform transactions.

According to an embodiment, a method for retrofitting an ATM with a wireless device is provided. The method includes (i) optionally receiving over at least one antenna an instruction to retrieve state data; (ii) receiving the state data over a hardware interface from an ATM; and, (iii) transmitting over a virtual private network (VPN) using the at least one antenna the state data, wherein the VPN is separate from a financial institution network the ATM communicates with to perform transactions.

DETAILED DESCRIPTION

Figure 1:
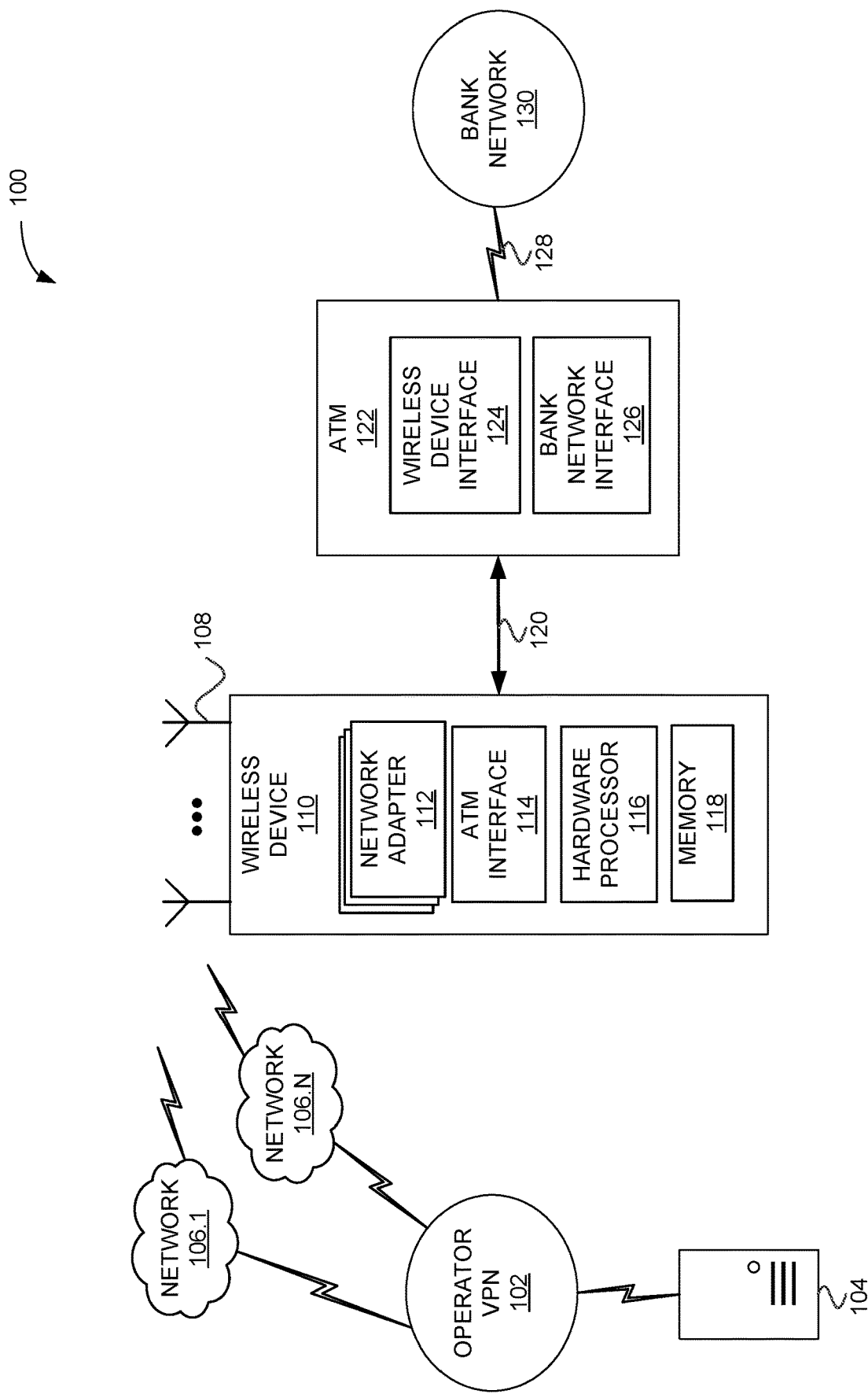
FIG. 1 illustrates a system for wireless device for retrofitting ATMs, in accordance with some embodiments.

FIG. 1 illustrates a system 100 for wireless device for retrofitting ATMs, in accordance with some embodiments. Illustrated in FIG. 1 is operator virtual private network (VPN) 102, backend computer 104, network 106.1 through network 106.N, wireless device 110, network adapter 112, ATM interface 114, hardware processor 116, memory 118, hardware connection 120, ATM 122, wireless device interface 124, bank network interface 126, connection 128, and bank network 130.

The operator VPN 102 is a VPN of an entity that operates or maintains the ATM 122 or a VPN that is used by an entity that operates or maintains ATM 122. For example, often ATMs 122 are leased, or the maintenance of the ATMs 122 is performed by a separate entity from the entity, e.g., bank, that is using the ATM 122 to provide banking services.

The backend computer 104 is a computer that accesses the wireless device 110 via the operator VPN 102 and network 106. The network 106 is one or more wireless communication networks, e.g., a wireless local area network (WLAN) that operates in communication with Institute of Electrical and Electronic Engineering (IEEE) 802.11, Long Term Evolution (LTE), LTE-advanced, Global System for Mobile communications (GSM), 3GPP, and 5G. In some embodiments, network 106 refrains from including some low energy networks such as BlueTooth® to prevent attempts at breaching the wireless device 110 from small wireless devices in proximity to the ATM 122.

Antennas 108 are one or more antennas configured to operate with one or more of the networks 106 and network adapters 112. The antennas 108 are operated by transceiver circuitry (not illustrated), in accordance with some embodiments.

Wireless device 110 is housed within the ATM 122, in accordance with some embodiments. Wireless device 110 is configured to communicate with the network 106 in accordance with a wireless communication protocol to access operator VPN 102 and backend computer 104. Wireless device 110 is configured to communicate with the ATM 122 in accordance with a hardwired protocol and/or software protocol over ATM interface 114.

Network adapters 112 are software and/or hardware for communicating over networks 106. For example, a network adapter 112 may include transceiver circuitry coupled to one or more antennas 108 to communicate over a 3GPP network and include software modules to operate in accordance with a 3GPP communication standard, e.g., LTE-advanced and/or 5G.

ATM interface 114 is software and/or hardware to interface with the ATM 122. The ATM interface 114 includes one or more pins that interfaces with wireless device interface 124. In some embodiments one or more of the pins has a functionality, e.g., a pin may initiate a re-booting of the ATM 122. In some embodiments the wireless device 110 is a chip that plugs into wireless device interface 124.

Hardware processor 116 is circuitry for processing the functions that the wireless device 110 performs. Hardware processor 116 is the same or similar as processor 1002 of FIG. 10, in accordance with some embodiments. Memory 118 is the same or similar as one or more of main memory 1004, static memory 1006, and/or mass storage 1016.

Hardware connection 120 is a hardware connection between the network adapter 112 and wireless device interface 124. The hardware connection 120 may be the same or similar as the wireless device interface 124 and/or the network adapter 112. In some embodiments, hardware connection 120 includes one or more standardized hardware interfaces, e.g., universal serial bus (USB) interface, a parallel interface, etc.

ATM 122 is a physical machine that performs banking services. The ATM 122 dispenses cash and accept deposits, in accordance with some embodiments. In some embodiments the wireless device 110 is housed at least partially within a housing of the ATM 122 and/or a common housing for the ATM 122 and wireless device 110.

Wireless device interface 124 interfaces with the hardware connection 120 and/or ATM interface 114. Wireless device interface 124 provides a hardware interface for the wireless device 110 to physically connect with.

Bank network interface 126 interfaces with the bank network 130 over connection 128. The ATM 122 may perform transactions with customers and interact with the bank network 130 to determine whether the transactions are permitted.

Connection 128 may be a hardwired connection and/or a wireless connection between the ATM 122 and the bank network 130. The bank network 130 is a networking system of a financial institution such as a bank. The bank network 130 has access to computers that store account information of customers and may connect with other banking networks. In some embodiments access to the bank network 130 by the wireless device 110 may be regulated by one or more government regulations.

Figure 2:
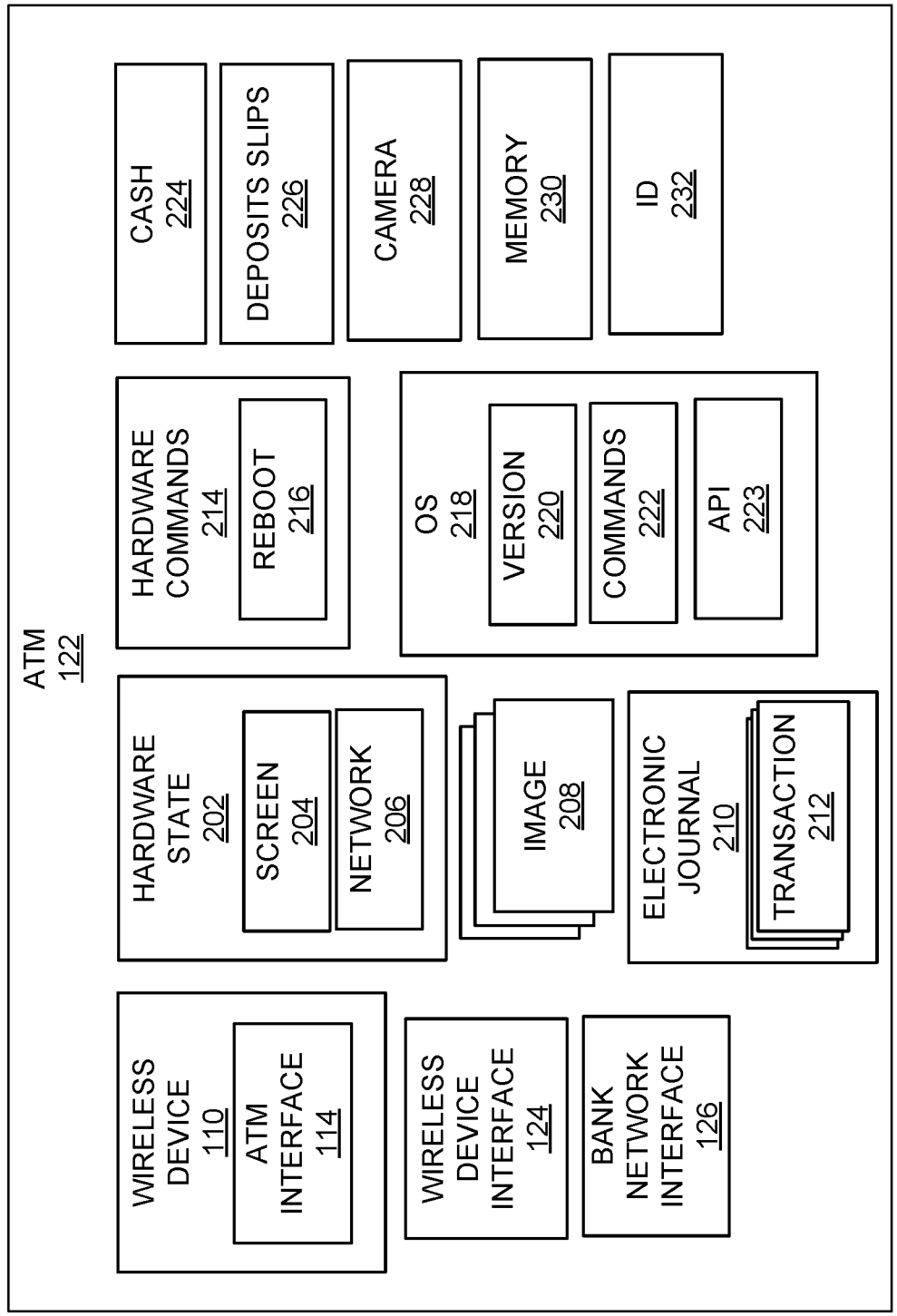
FIG. 2 illustrates an ATM, in accordance with some embodiments.

FIG. 2 illustrates an ATM 122, in accordance with some embodiments. ATM 122 may be the same or similar as ATM 122 of FIG. 1. ATM 122 includes wireless device 110, ATM interface 114, wireless device interface 124, bank network interface 126, hardware state 202, screen 204, network 206, images 208, electronic journal (EJ) 210, transactions 212, hardware commands 214, reboot 216, operating system (OS) 218, version 220, commands 222, application program interface (API) 223, cash 224, deposit slips 226, camera 228, memory 230, and identification (ID) 232.

The wireless device interface 124 is the same or similar as wireless device interface 124 of FIG. 1. Bank network interface 126 is the same or similar as bank network interface 126 of FIG. 1.

Hardware state 202 indicates a state of the hardware of the ATM 122. Screen 204 is a hardware state 202 and indicates whether a screen (not illustrated) of the ATM is operating properly. Network 206 is a hardware state 202 and indicates whether the bank network interface 126 and/or the network the bank network interface is connected to and operating properly. The hardware state 202 is an indication of the hardware state 202 stored in a memory of the ATM 122, in accordance with some embodiments. The hardware state 202 may be inferred from the behavior of the ATM 122. For example, if wireless device 110 attempts to receive signals from the screen and there is no response, the wireless device 110 may infer that the hardware state 202 of the screen 204 is not operating.

Images 208 are images captured from the camera 228. The images 208 may be associated with transactions 212. EJ 210 may be a journal that logs the transactions 212 that have occurred on the ATM 122. Example transactions 212 include withdrawal of money by a customer and deposit of money by a customer. Transactions 212 may include data that is associated with a transaction 212. For example, a transaction 212 may include an amount of cash withdrawn and an identification of a customer that withdrew the cash. In another example, a transaction 212 may include an amount and type of deposit and an identification of a customer that deposited the money, which may be in cash or check form. In some embodiments the identification of a customer is encoded. Hardware commands 214 are commands that the ATM 122 may be configured to respond to from the wireless device interface 124. An example hardware command 214 includes reboot 216. Reboot 216 is a hardware command 214 where wireless device 110 may raise a signal over the ATM interface 114 (e.g., a hardware interface) that is communicated via the wireless device interface 124 (e.g., a hardware interface) where the signal causes the ATM 122 to reboot.

OS 218 is an operating system of the ATM 122. The hardware commands 214 may operate independently of the OS 218. Version 220 may be a version of the OS 218. Commands 222 may be commands that the OS 218 is configured to respond to or perform. In some embodiments API 223 are interfaces for providing services to the wireless device 110, e.g., wireless device 110 may access reboot 312 by calling an interface that is part of the API 223. In some embodiments API 223 provides access to commands that push state data to the wireless device 110. In some embodiments API 223 are interfaces that are used to push out data to the wireless device 110, e.g., cash 224, deposit slips 226, etc. Cash 224 may be an indication of an amount of cash that is currently in the ATM 122. Deposit slips 226 may be an indication of which deposit slips 226 are in the ATM 122. In some embodiments, images 208 includes images of the deposit slips 226 captured by another camera (not illustrated) of the ATM 122 to capture images of deposit slips 226. The camera 228 may be a digital camera that captures images 208. The camera 228 is configured to capture images of customers as they perform transactions 212. Memory 230 may be the same or similar as main memory 1104, mass storage 1116, and/or static memory 1124.

In some embodiments the wireless device 110 is housed within the ATM 122. The wireless device 110 and ATM 122 communicate via the ATM interface 114 and wireless device interface 124. In some embodiments wireless device 110 is installed in the ATM 122 after the ATM 122 has been deployed.

Figure 5:
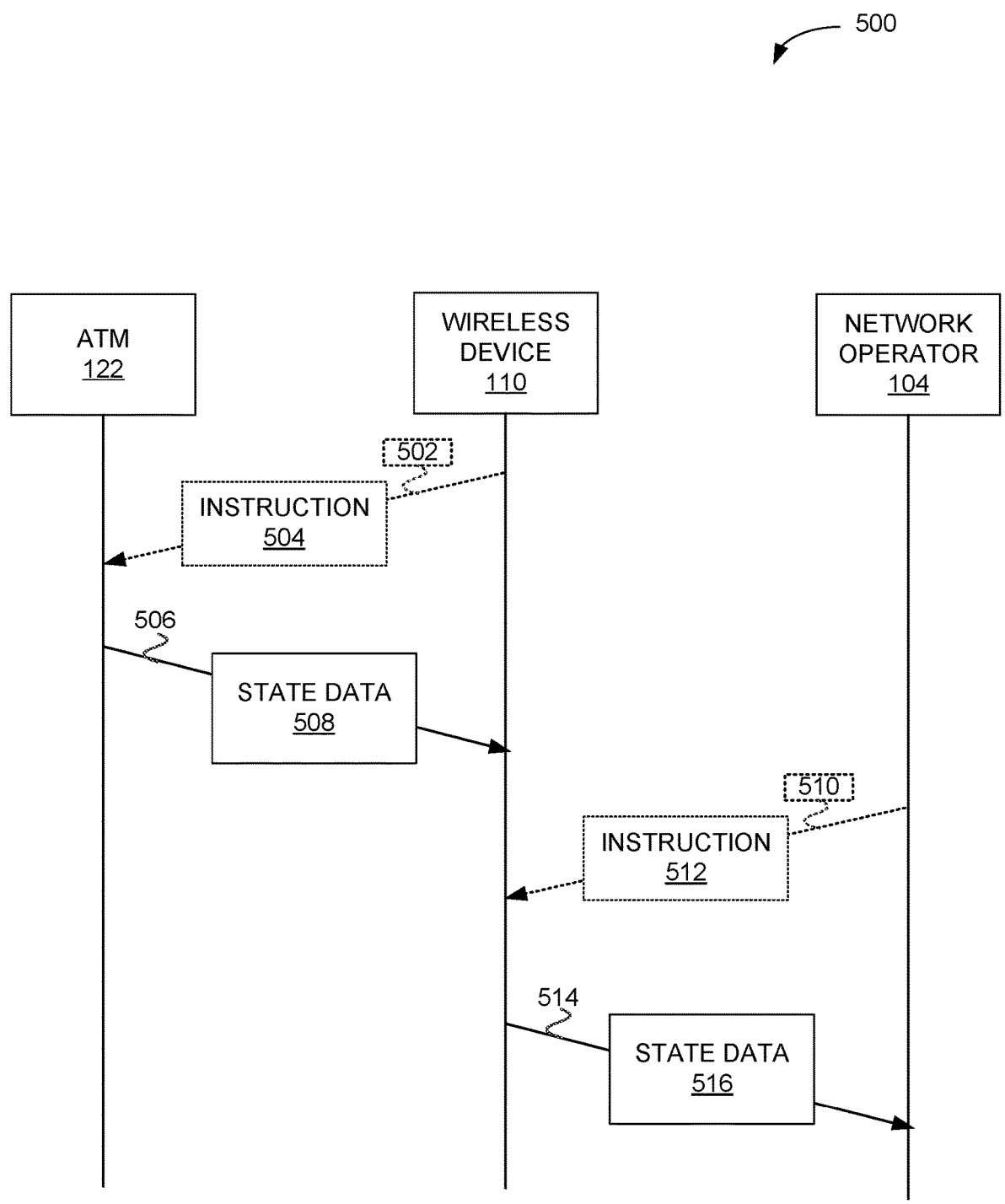
FIG. 5 illustrates a method performed on a wireless device for retrofitting ATMs in accordance with some embodiments.

In some embodiments ATM 122 is configured to push data to the wireless device 110 over the wireless device interface 124. For example, the ATM 122 may push the electronic journal 210, hardware state 202, images 208, version 220, and/or state data 508 (FIG. 5). In some embodiments, the ATM 122 does not recognize software commands that are received over the wireless device interface 124, which may be due to security so that the wireless device interface 124 does not pose a security threat to the ATM 122 or the bank network 130. In some embodiments, ATM 122 is configured to respond to signal changes at the wireless device interface 124 by executing a command, e.g., a drop signal or a raised signal. For example, a raised signal at the wireless device interface 124 may indicate that the ATM 122 is to reboot. In some embodiments ATM 122 includes a separate memory 230 or a portion of memory 230 where data is stored for access by wireless device 110. In some embodiments data is stored encrypted or pushed to the wireless device 110 encrypted.

Figure 3:
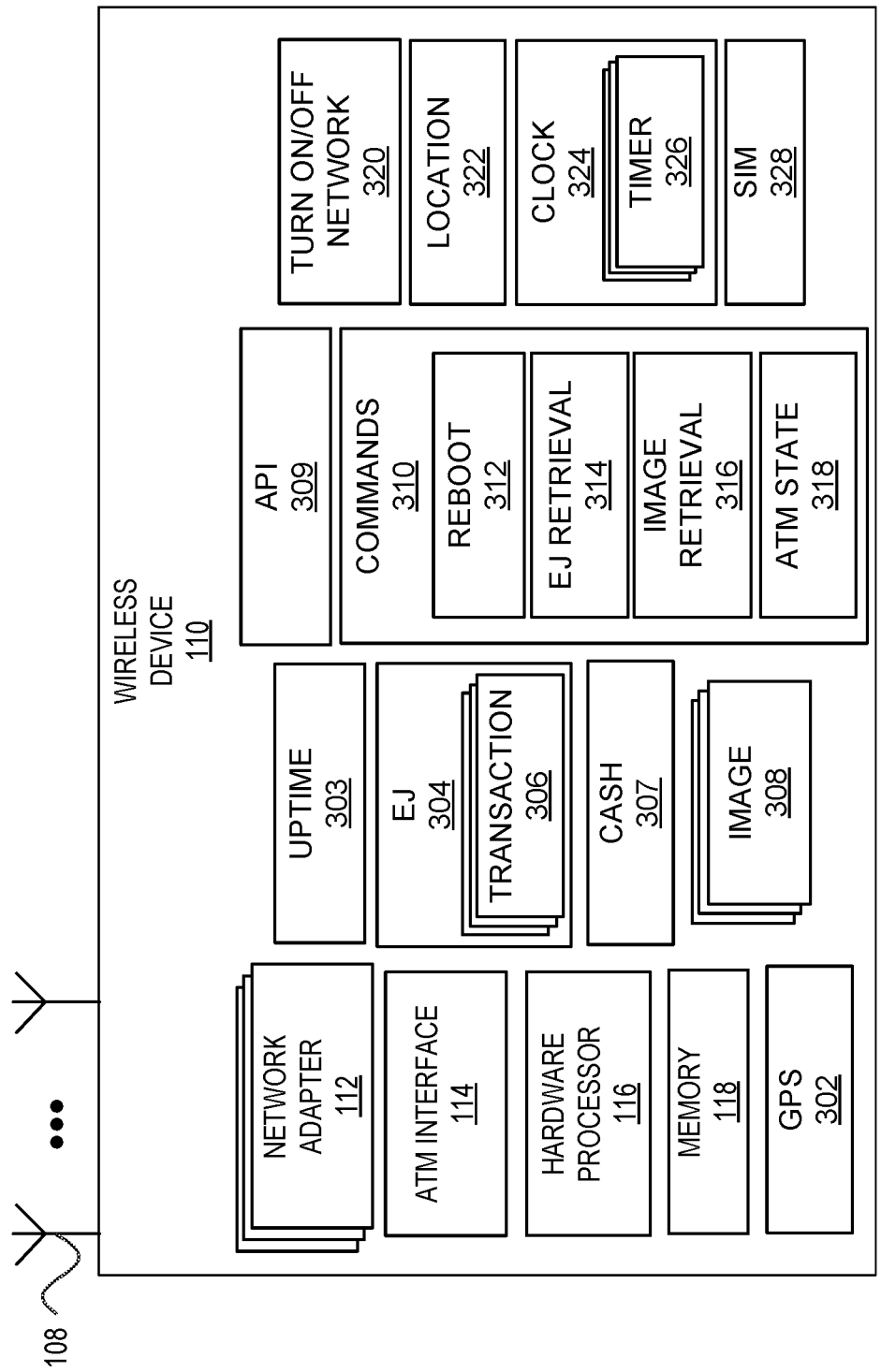
FIG. 3 illustrates a wireless device, in accordance with some embodiments.

FIG. 3 illustrates a wireless device 110, in accordance with some embodiments. Illustrated in FIG. 3 is one or more antenna 108, network adapter 112, ATM interface 114, hardware processor 116, memory 118, GPS 302, uptime 303, EJ 304, transactions 306, cash 307, images 308, API 309, commands 310, reboot 312, EJ retrieval 314, image retrieval 316, ATM state 318, turn on/off network 320, location 322, clock 324, timers 326, and subscriber identity module (SIM) 328.

The at least one antenna 108 is the same or similar as at least one antenna 108 of FIG. 1. Network adapter 112 is the same or similar as network adapter 112 of FIG. 1. Hardware processor 116 is the same or similar as hardware processor 116 of FIG. 1. Memory 118 is the same or similar as memory 118 of FIG. 1. Global positioning system (GPS) 302 is a device to determine the position of the wireless device 110. Uptime 303 may be a time since the ATM 122 was last down. In some embodiments GPS 302 determines a location 322 using signals from satellites. In some embodiments GPS 302 determines location 322 based on wireless communication signals. In some embodiments GPS 302 determines location 322 based on signals received from ATM 122, e.g., ATM 122 may send a location 322 to the wireless device 110 where the ATM 122 determined the location 322.

EJ 304 may be stored in the memory 118. EJ 304 may be the same or similar as EJ 210 of FIG. 2. Cash 307 may be an indication of how much cash is in the ATM 122. Wireless device 110 is configured to transmit the state data 508 (FIG. 5) such as EJ 304 to network operator 104 over operator VPN 102. In some embodiments wireless device 110 encrypts state data 508 such as EJ 304 before transmitting it over operator VPN 102 to the network operator 104. State data 508 such as EJ 304 may be pushed to the wireless device 110 from the ATM 122. The ATM 122 may encrypt the state data 508 such as EJ 304 prior to sending it to the wireless device 110 so that the wireless device 110 may not be able to decrypt the EJ 304. The backend computer 104 may be able to decrypt the state data 508 such as the EJ 304.

Images 308 are the same or similar as images 208. API 309 may be interfaces for accessing commands 310 within the wireless device 110 or for accessing commands 222 of the ATM 122. Commands 310 are commands that the wireless device 110 may perform, e.g., in response to instructions from the network operator 104. Reboot 312 is a command 310 that reboots the ATM 122. The reboot 312 may be performed based on raising or lowering one or more signals on the ATM interface 114 to reboot the ATM 122. EJ retrieval 314 retrieves the EJ 210 from the ATM 122 as EJ 304. Image retrieval 316 retrieves images 208 as images 308. ATM state 318 determines or retrieves the hardware state 202 of the ATM 122. The commands 310 may be performed in response to receiving an instruction from the network operator 104. Commands 310 may include other commands 310 to retrieve and/or determine state data 508.

Turn on/off network 320 turns on or off the wireless connection of the wireless device 110. For example, this may remove power from the network adapter 112 or it may disable a software program running on the hardware processor 116. Location 322 is a location of the wireless device 110. Clock 324 is a clock that indicates a time and is optional. Timers 326 are timers that may activate commands 310. For example, a timer 326 may be set to transmit state data 508 such as EJ 304 to the network operator 104 once a period of time, e.g., an hour or day. In some embodiments a timer 326 is set to periodically perform ATM state 318 and the hardware processor 116 is configured to examine the determined hardware state 202 of the ATM 112 and perform a reboot 312 if the hardware state 202 indicates the ATM 112 is not working properly. In some embodiments ATM state 318 is periodically transmitted to the network operator 104. In some embodiments ATM state 318 is transmitted to the network operator 104 when the ATM state 318 indicates a problem with ATM 122. In some embodiments the SIM 328 provides an identify for the wireless device 110 to access the network 106. In some embodiments the wireless device 110 is a chip that plugs into the ATM 122.

Figure 4:
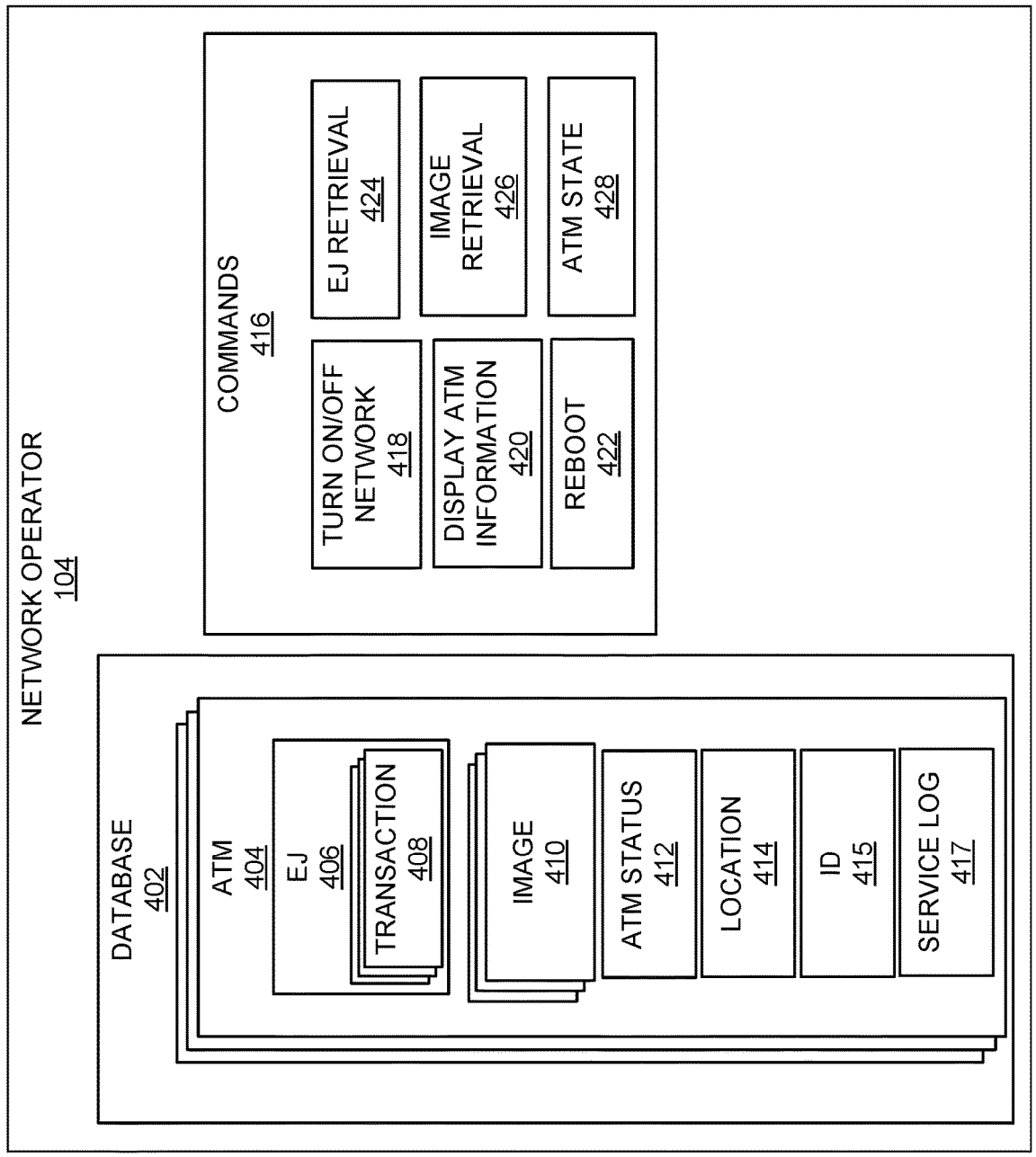
FIG. 4 illustrates network operator in accordance with some embodiments.

FIG. 4 illustrates network operator 104 in accordance with some embodiments. Illustrated in FIG. 4 is database 402, ATMs 404, EJs 406, transactions 408, images 410, ATM statuses 412, locations 414, identification (ID) 415, commands 416, service log 417, turn on/off network 418, display ATM information 420, reboot 422, EJ retrieval 424, image retrieval 426, and ATM state 428.

The database 402 is a database that may be stored on one or more computers. ATMs 404 is information regarding ATMs, e.g., 212. ID 415 is identity information that identifies the ATM 404, e.g., ID 232 of FIG. 2.

EJ 406, transactions 408, images 410, ATM status 412, location 414, and ID 415 are information regarding the ATM 212 identified by the ID 415. EJ 406, transactions 408, images 410, location 414, and ID 415 are the same or similar as, referring to FIG. 2, EJ 210, transactions 212, images 208, location 322 (FIG. 3), and ID 232, respectively. ATM status 412 may include cash, uptime, deposit slips, etc. For example, the service log 417 may indicate each time the ATM 404 has been serviced and how often it has been out of service. ATM status 412 may include cash, e.g., cash 224, that indicates a current amount of cash in the ATM 122 identified by ID 415. Uptime may indicate how long the ATM 212 has been on and operational where ATM 212 is the ATM identified by ID 415. Service log 417 may include other information such as the information displayed on support screen 800.

Commands 416 are commands that may be performed by the network operator 104. Turn on/off network 418 may be sent to the wireless device 110 to turn on/off network 320. Display ATM information 420 displays information regarding one or more ATMs 212, e.g., support screen 800. Reboot 422 sends a command to the wireless device 110 to reboot the ATM 212. EJ retrieval 424 sends a command to the wireless device 110 to transmit and/or retrieve the EJ 304. Image retrieval 426 sends a command to the wireless device 110 to transmit and/or retrieve the images 308. ATM state 428 sends a command to the wireless device 110 to determine and/or retrieve the hardware state 202 of the ATM 122.

FIG. 5 illustrates a method 500 performed on a wireless device for retrofitting ATMs in accordance with some embodiments. Illustrated in FIG. 5 is ATM 122, wireless device 110, and network operator 104. The method 500 begins with the optional operation of wireless device 110 sending communication 502 comprising instruction 504.

The instruction 504 is one of the commands 310. In some embodiments the instruction 504 is a hardware instruction that changes the voltage on one or more pins of the network adapter 112. In some embodiments the instruction 504 is a software encoded instruction to the OS 218 of the ATM 122.

The method 500 continues with the ATM 122 sending communication 506 comprising state data 508. The state data 508 may be hardware state 202, images 208, electronic journal 210, deposit slips 226, cash 224, or other data from the ATM 122. The ATM 122 may be responding to hardware signals that transfer state data 508. In some embodiments OS 218 receives the instruction 504 and sends state data 508 over wireless device interface 124 to the wireless device 110. In some embodiments ATM 122 sends state data 508 to the wireless device 110 periodically or based on an event in addition to or instead of in response to the instruction 504.

Method 500 continues with the optional operation of network operator 104 sending communication 510 comprising instruction 512 over operator VPN 102 to wireless device 110. Instruction 512 is one or more commands 416. The wireless device 110 processes the instruction 512. Method 500 continues with wireless device 110 transmitting communication 514 comprising state data 516 over operator VPN 102 to network operator 104. State data 516 includes the same or similar data as state data 508, e.g., EJ 304, images 308, a confirmation of a command such as reboot 312, and/or ATM state 318. In some embodiments wireless device 110 sends state data 516 to the network operator 104 periodically or based on an event in addition to or instead of in response to the instruction 512.

Method 500 may include one or more additional operations. One or more operations of method 500 may be optional. One or more of the operations may be performed in a different order than illustrated.

Figure 6:
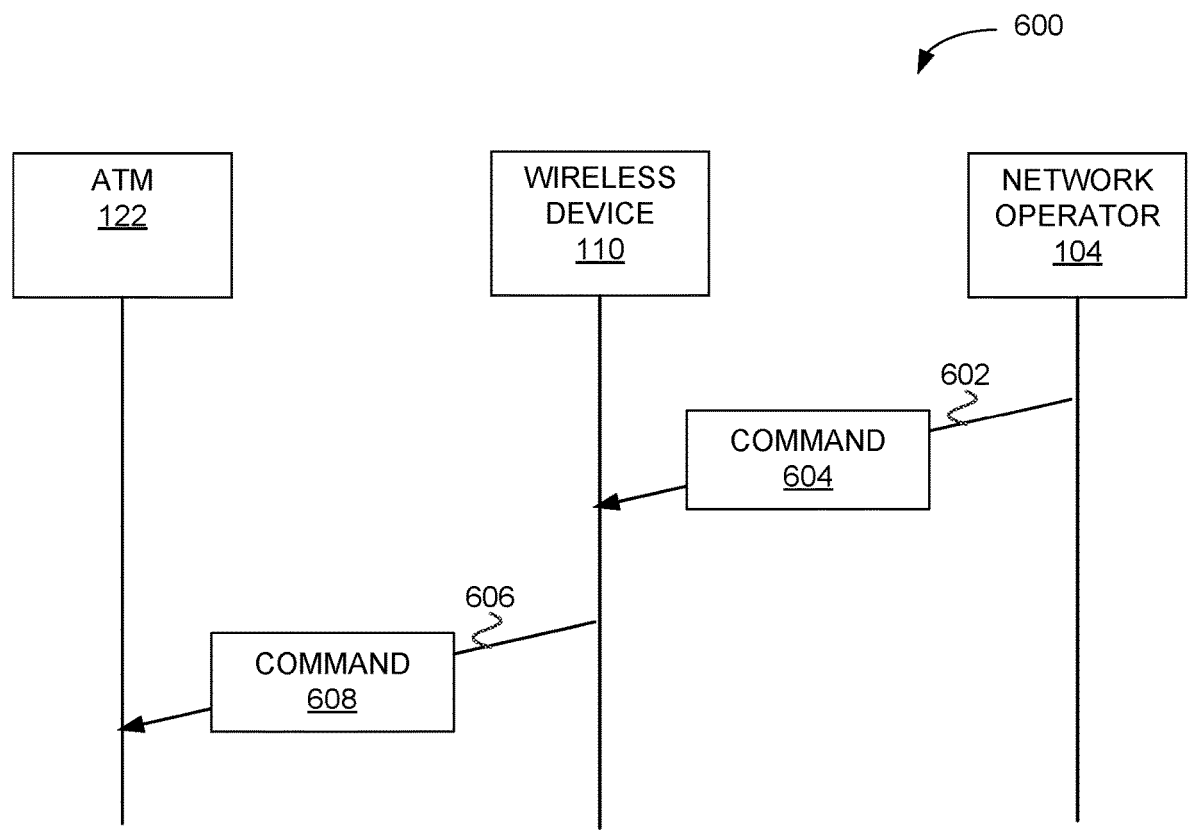
FIG. 6 illustrates a method performed on a wireless device for retrofitting ATMs in accordance with some embodiments.

FIG. 6 illustrates a method 600 performed on a wireless device for retrofitting ATMs in accordance with some embodiments. Illustrated in FIG. 6 is ATM 122, wireless device 110, and network operator 104. The method 600 begins with network operator 104 sending communication 602 comprising command 604 such as reboot over the operator VPN 102. Command 604 is an instruction to the wireless device 110 such as to reboot the ATM 122. Command 604 may be a command such as reboot 422 (FIG. 4) and may include an ID 232 of the ATM 122. The method 600 continues with wireless device 110 sending communication 606 comprising command 608 to the ATM 122. For example, wireless device 110 may raise a signal on a pin of ATM interface 114 to initiate a reboot of the ATM 122.

Method 600 may include one or more additional operations. One or more operations of method 600 may be optional. One or more of the operations may be performed in a different order than illustrated.

Figure 7:
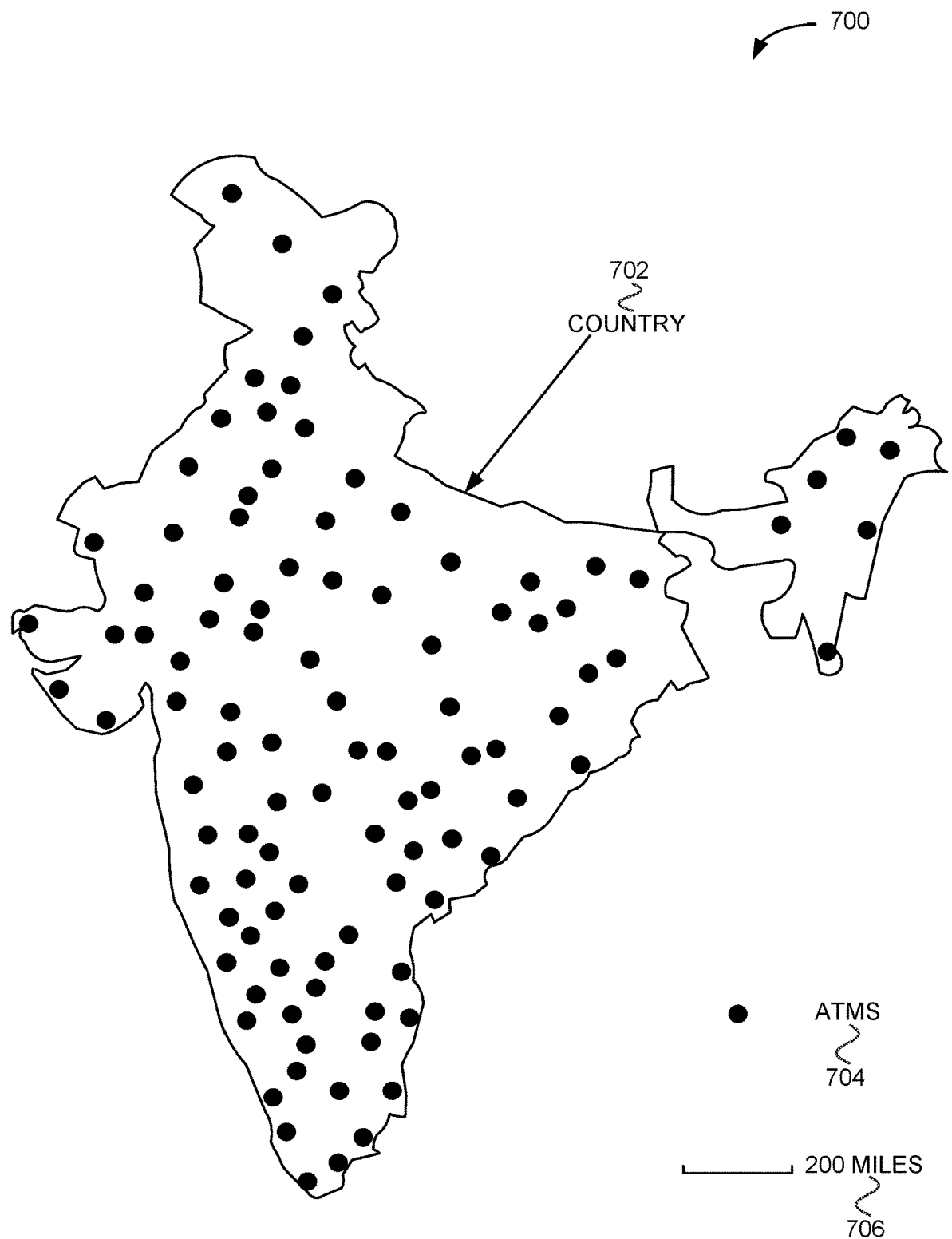
FIG. 7 illustrates a distribution of ATMs throughout a country in accordance with some embodiments.

FIG. 7 illustrates a distribution of ATMs throughout a country 700 in accordance with some embodiments. Illustrated in FIG. 7 country 702, ATMs 704, and 200 miles 706. The ATMs 704 may be one or more ATMs 212. 200 miles 706 indicates a distance of 200 miles. The ATMs 704 are distributed throughout the country. A repairperson or serviceperson to add cash travelling to the different ATMs 704 may be expensive. Additionally, repair people may be better scheduled if there is some indication of the problem an ATM 704 is having and some indication of a version 220 of the OS 218 that the ATM 212 is running. And, often, a mere reboot command may repair an ATM 704. In some embodiments a number of ATMs 704 that are maintained by a single company may be 10,000 or more.

Figures 8, 9:
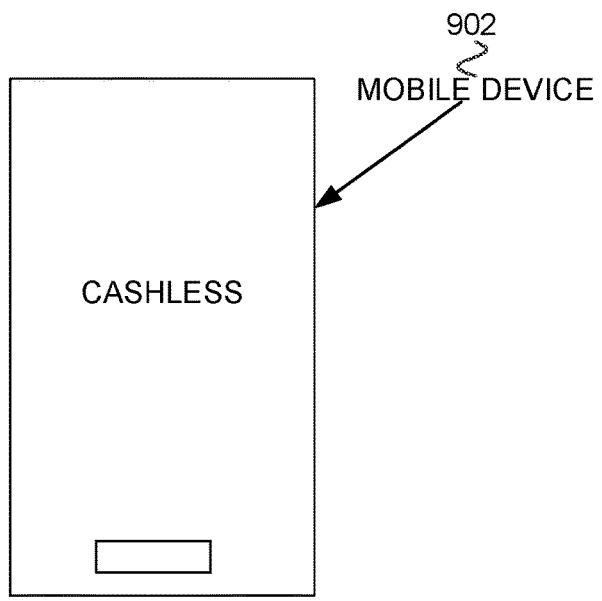
FIG. 8 illustrates a support screen in accordance with some embodiments.
FIG. 9 illustrates a mobile device in accordance with some embodiments.

FIG. 8 illustrates a support screen 800 in accordance with some embodiments. Illustrated in FIG. 8 is support screen 800, which may comprise ATM ID 802, operational 804, OS 806, last service 808, next service 810, and EJ/Images 812. ATM ID 802 may be an ID of the ATM 212, e.g., ID 232. Operational 804 may indicate whether the ATM 212 is operational 804, e.g., as indicate "Y" for yes. Other values may be displayed for operational 804 to indicate that the ATM 212 is not working, it is indeterminate whether it is working, or the ATM 212 is partially working, e.g., working but out of cash. OS 806 indicates an OS version 220, e.g., "Windows 10". Last service 808 indicates when the ATM 212 was last serviced, e.g., Oct. 10, 2019. Next service Feb. 12, 2020 indicates when the ATM 212 is to be serviced again. In some embodiments, the support screen 800 indicates how much cash the ATM 212 has. In some embodiments, the next service Feb. 12, 2020 is based on when cash needs to be added to the ATM 212. EJ/images 812 indicates when the last time the EJ 210 and/or images 208 were retrieved from the ATM 212. Other items may be displayed. In some embodiments fewer items are displayed. The database 402 of ATMs 404 enables the network operator 104 to efficiently schedule maintain of the ATMs 212. The database 402 of ATMs 404 enables the network operator 104 to provide a repairperson with additional information about the ATM 212 such as the OS version 220.

The support screen 800 is generated by the network operator 104 and may be displayed on a remote computer. The network operator 104 displays information stored in the database 402, which may be collected from wireless devices 110 from ATMs 212. The support screen 800 may be used to assist in route planning of service or repair people for the ATMs, e.g., ATMs 704.

FIG. 9 illustrates a mobile device 902 in accordance with some embodiments. Illustrated in FIG. 9 is mobile device 902. A mobile device 902 may be used to perform a cashless transaction, e.g., to deposit a check, transfer money, and/or pay at a physical or online store. The cashless transaction have lessened the need for additional ATMs 212 so that manufacturers are reluctant to invest in next generation ATMs 212.

Figure 10:
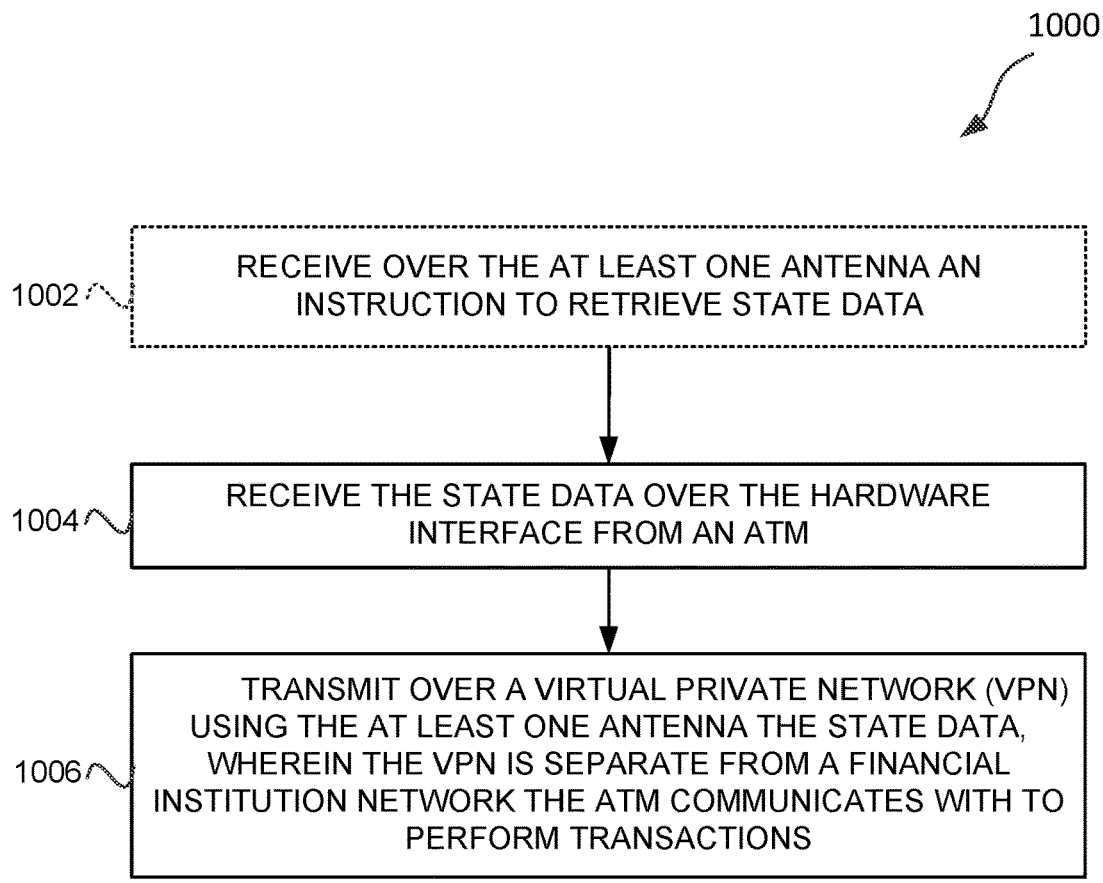
FIG. 10 illustrates a method performed on a wireless device for retrofitting ATMs in accordance with some embodiments.

FIG. 10 illustrates a method 1000 performed on a wireless device for retrofitting ATMs in accordance with some embodiments. The method 1000 begins at operation 1002 with receiving over the at least one antenna an instruction to retrieve a state data. For example, wireless device 110 may receive an instruction from the network operator 104 to retrieve state data, e.g., commands 416 such as EJ retrieval 424. State data may be the same or similar as state data 508.

The method 1000 continues at operation 1004 with receiving the state data over the hardware interface from an ATM. For example, the ATM 122 may send over the wireless device interface 124 state data 508. In some embodiments wireless device 110 sends a command for the ATM 122 to send the state data, e.g., commands 210 such as EJ retrieval 314. In another example, wireless device 110 transmits communication 506 of FIG. 5.

The method 1000 continues at operation 1006 with transmitting over a VPN using the at least one antenna the state data, where the VPN is separate from a financial institution network the ATM communicates with to perform transactions. For example, wireless device 110 transmits EJ 304 over network adapter 112 over the network 106 and over operator VPN 102 to network operator 104. Networks 106 and operator VPN 102 are separate from bank network 130. In another example, wireless device 110 transmits communication 514 of FIG. 5.

Method 1000 may include one or more additional operations. One or more operations of method 1000 may be optional. One or more of the operations may be performed in a different order than illustrated. Method 1000 may be performed by an apparatus of a wireless device 110. Method 1000 may be performed by a wireless device 110.

Figure 11:
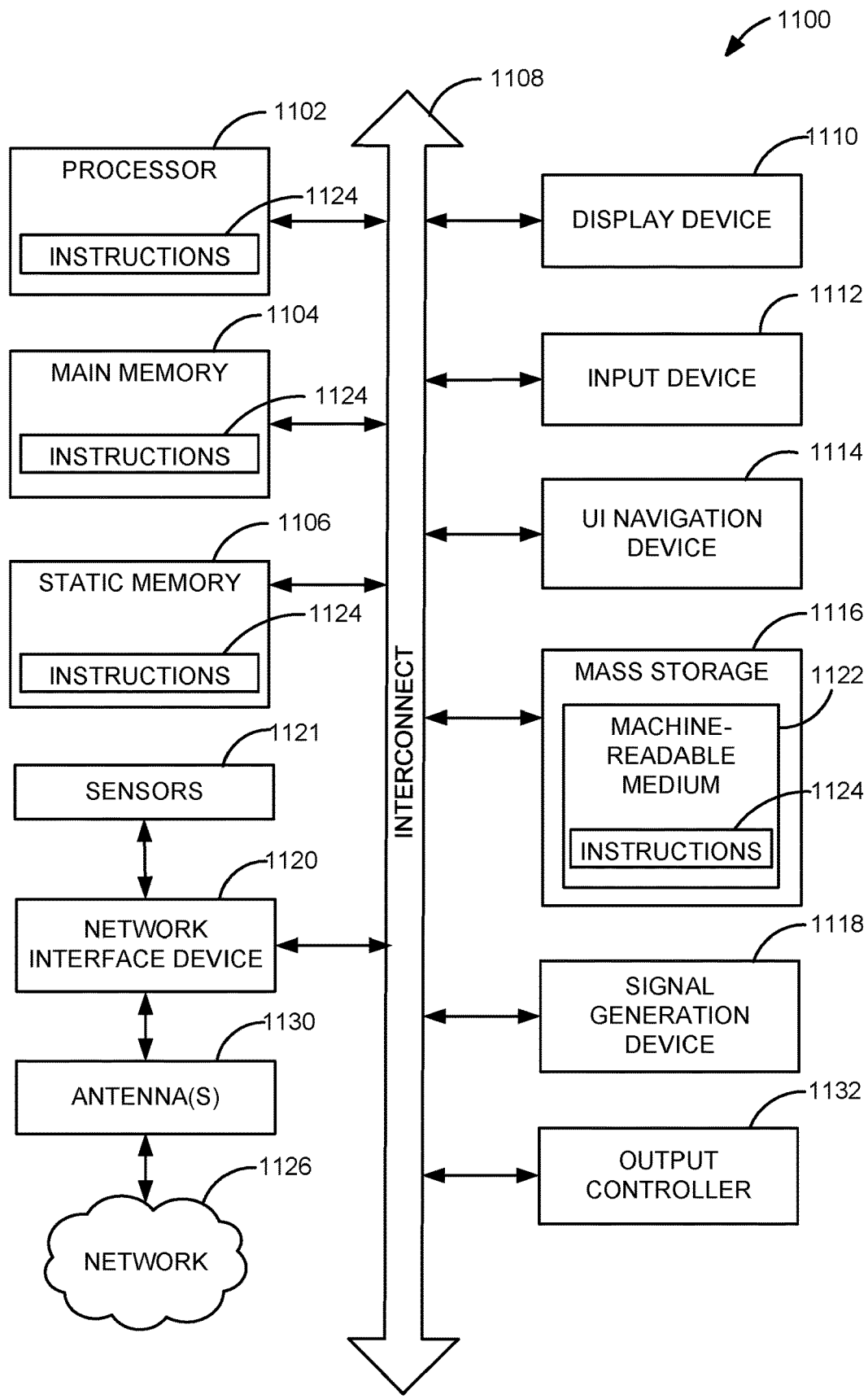
FIG. 11 illustrates a block diagram of an example machine upon which any one or more of the techniques (e.g., methodologies) discussed herein may perform.

FIG. 11 illustrates a block diagram of an example machine 1100 upon which any one or more of the techniques (e.g., methodologies) discussed herein may perform. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a server, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108.

Specific examples of main memory 1104 include Random Access Memory (RAM), and semiconductor memory devices, which may include, in some embodiments, storage locations in semiconductors such as registers. Specific examples of static memory 1106 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1100 may further include a display device 1110, an input device 1112 (e.g., a keyboard), and a user interface (UI) navigation device 1114 (e.g., a mouse). In an example, the display device 1110, input device 1112 and UI navigation device 1114 may be a touch screen display. The machine 1100 may additionally include a mass storage (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1132, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1102 and/or instructions 1124 may comprise processing circuitry and/or transceiver circuitry.

The storage device 1116 may include a machine readable medium 1122 on which is stored one or more sets of data structures or instructions 1124 (e.g., software) embodying or utilized by any one or more of the techniques, functions, or methods (e.g., method 1000) described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

Specific examples of machine-readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1122 is illustrated as a single medium, the term "machine readable medium" may include a single medium or multiple media (e.g., a centralized or distributed database, and/or associated caches and servers) configured to store the one or more instructions 1124.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.15 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1120 may include one or more physical jacks (e.g., Ethernet, coaxial, or phone jacks) or one or more antennas to connect to the communications network 1126. In an example, the network interface device 1120 may include one or more antennas 1130 to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques. The term "transmission medium" shall be taken to include any intangible medium that is capable of storing, encoding or carrying instructions for execution by the machine 1100, and includes digital or analog communications signals or other intangible medium to facilitate communication of such software.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

What is claimed is:

1. A wireless device, comprising:
    a memory; at least one hardware processor coupled to the memory; a hardware interface coupled to the least one hardware processor; and, at least one antenna coupled to the at least one hardware processor, wherein the at least one hardware processor is configured to:
    (i) receive via the at least one antenna an instruction to retrieve state data; (ii) transmit one or more first signals, via the hardware interface to an Automatic Teller Machines (ATM) to determine the state data and an operating state of the ATM, wherein the hardware interface is configurable to be physically connected with the ATM; (iii) receive second signals, via the hardware interface, from the ATM in response to the first signals; and, (vi) determine the state data and the operating state of the ATM based on the received second signals; and, (v) transmit via a virtual private network (VPN) using the at least one antenna the state data and the operating state of the ATM, wherein the VPN is separate from a financial institution network used by the ATM to perform financial transactions, wherein the state data comprises at least one of the following: a hardware state of the ATM, an electronic journal (EJ), an amount of cash contained within the ATM, an amount of deposit slips of the ATM, and an indication of whether the ATM is operating, and wherein the wireless device is configurable to be installed within the ATM after the ATM is deployed.

2. The wireless device of claim 1 wherein the wireless device is configured to transmit in accordance with one or more of the following group: 3GPP, LTE, LTE-Advanced, and 5G.

3. The wireless device of claim 1 wherein the hardware interface is coupled to the ATM.

4. The wireless device of claim 1 wherein the one or more first signals comprise electrical signals that cause the ATM to transmit the state data and the operating state over the hardware interface.

5. The wireless device of claim 3 wherein the one or more first signals refrain from requesting an operating system of the ATM to transmit the state data and the operating state.

6. The wireless device of claim 1, wherein the EJ comprises transactions of the ATM and wherein the transactions of the ATM comprise indications of bills dispensed from the ATM, indications of identities of the accounts associated with the transactions, and images associated with the transactions of the ATM, wherein the images are captured from a camera of the ATM.

7. The wireless device of claim 1 wherein the at least one hardware processor is further configured to:
    encrypt the state data before transmitting the state data over the at least one antenna.

8. The wireless device of claim 1 wherein the instruction is a first instruction and wherein the at least one hardware processor is further configured to:
    (i) receive over the at least one antenna a second instruction to retrieve images; (ii) receive the images over the hardware interface from the ATM; and, (iii) transmit the images over the at least one antenna.

9. The wireless device of claim 1 wherein the instruction is a first instruction and wherein the at least one hardware processor is further configured to:
    (i) receive over the antenna a second instruction to reboot the ATM; and, (ii) raise a signal of the hardware interface to reboot the ATM.

10. The wireless device of claim 1 wherein the wireless device is housed within the ATM.

11. The wireless device of claim 10 wherein the wireless device is installed within the ATM after the ATM is deployed.

12. The wireless device of claim 1 wherein the operating state comprises one or more of the following group: whether the ATM is on, whether a screen of the ATM is operating properly, whether the ATM is connected to a network of an entity that operates the ATM, and whether a keypad of the ATM operates properly.

13. The wireless device of claim 1 wherein the at least one hardware processor is further configured to:
    (vi) receive second signals from the ATM; (vii) determine the operating state of the ATM based on the received second signals; and, (viii) transmit the operating state of the ATM over the at least one antenna.

14. A method comprising:
    (i) receiving via the at least one antenna an instruction to retrieve state data; (ii) transmitting one or more first signals, via the hardware interface to an Automatic Teller Machines (ATM) to determine the state data and an operating state of the ATM, wherein the hardware interface is configurable to be physically connected with the ATM; (iii) receiving second signals, via the hardware interface, from the ATM in response to the first signals; and, (vi) determine the state data and the operating state of the ATM based on the received second signals; and, (v) transmitting via a virtual private network (VPN) using the at least one antenna the state data and the operating state of the ATM, wherein the VPN is separate from a financial institution network used by the ATM to perform financial transactions, wherein the state data comprises at least one of the following: a hardware state of the ATM, an electronic journal (EJ), an amount of cash contained within the ATM, an amount of deposit slips of the ATM, and an indication of whether the ATM is operating, and wherein the wireless device is configurable to be installed within the ATM after the ATM is deployed.

15. The method of claim 14 wherein the transmitting further comprises:
    transmitting in accordance with one or more of the following group: 3GPP, LTE, LTE-Advanced, and 5G.

16. A system, comprising:
    a wireless device, the wireless device comprising: a memory; at least one hardware processor coupled to the memory; a hardware interface coupled to the least one hardware processor; and, at least one antenna coupled to the at least one hardware processor, wherein the at least one hardware processor is configured to:

(i) receive via the at least one antenna an instruction to retrieve state data; (ii) transmit one or more first signals, via the hardware interface to an Automatic Teller Machines (ATM) to determine the state data and an operating state of the ATM, wherein the hardware interface is configurable to be physically connected with the ATM; (iii) receive second signals, via the hardware interface, from the ATM in response to the first signals; and, (vi) determine the state data and the operating state of the ATM based on the received second signals; and, (v) transmit via a virtual private network (VPN) using the at least one antenna the state data and the operating state of the ATM, wherein the VPN is separate from a financial institution network used by the ATM to perform financial transactions, wherein the state data comprises at least one of the following: a hardware state of the ATM, an electronic journal (EJ), an amount of cash contained within the ATM, an amount of deposit slips of the ATM, and an indication of whether the ATM is operating, and wherein the wireless device is configurable to be installed within the ATM after the ATM is deployed.

17. The system of claim 16 further comprising the ATM.

* * * * *